United States Patent [19]

Laurès

[11] Patent Number: 4,543,603
[45] Date of Patent: Sep. 24, 1985

[54] RECONNAISSANCE SYSTEM COMPRISING AN AIR-BORNE VEHICLE ROTATING ABOUT ITS LONGITUDINAL AXIS

[75] Inventor: Pierre Laurès, Chatenay-Malabry, France

[73] Assignee: Societe Nationale Industrielle et Aerospatiale, Paris, France

[21] Appl. No.: 550,538

[22] Filed: Nov. 10, 1983

[30] Foreign Application Priority Data

Nov. 30, 1982 [FR] France ................... 82 20066

[51] Int. Cl.$^4$ ............................................. H04N 7/18
[52] U.S. Cl. ..................................... 358/109; 358/108
[58] Field of Search ................. 358/109, 113, 108, 99; 356/4; 250/330, 331, 332, 334; 364/456; 244/3.16

[56] References Cited

U.S. PATENT DOCUMENTS 3,721,410  3/1973  Anspacher ..................... 358/109

Primary Examiner—Howard W. Britton
Assistant Examiner—Victor R. Kostak
Attorney, Agent, or Firm—Fisher, Christen & Sabol

[57] ABSTRACT

The invention relates to a reconnaissance system comprising an air-borne vehicle capable of moving above a territory to be surveyed by rotating about its longitudinal axis, and means for taking images disposed on board the vehicle to observe said territory by a helicoidal scanning in relation with the rotation of the vehicle, wherein the vehicle is of the self-propelled missile type and the sensitive members are formed by at least one linear assembly of photosensitive elements disposed parallel to the longitudinal axis of the missile to give at each line an image of an elementary strip of territory, which scans a strip of territory upon each revolution of the missile, the total image of the territory being formed by the plurality of images of the successive strips.

4 Claims, 9 Drawing Figures

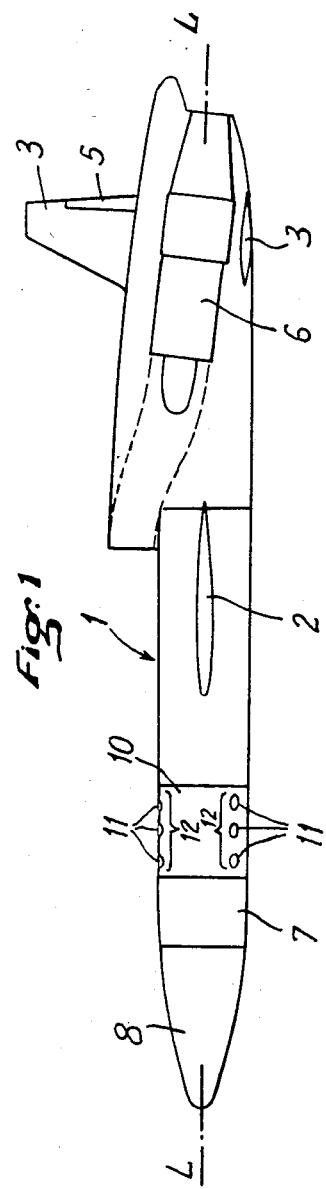
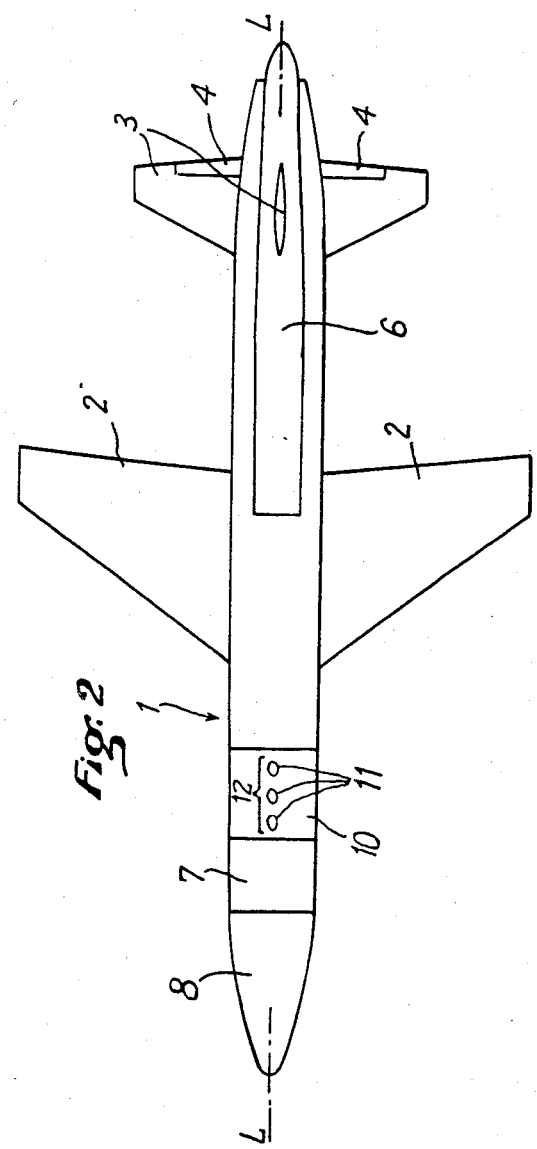

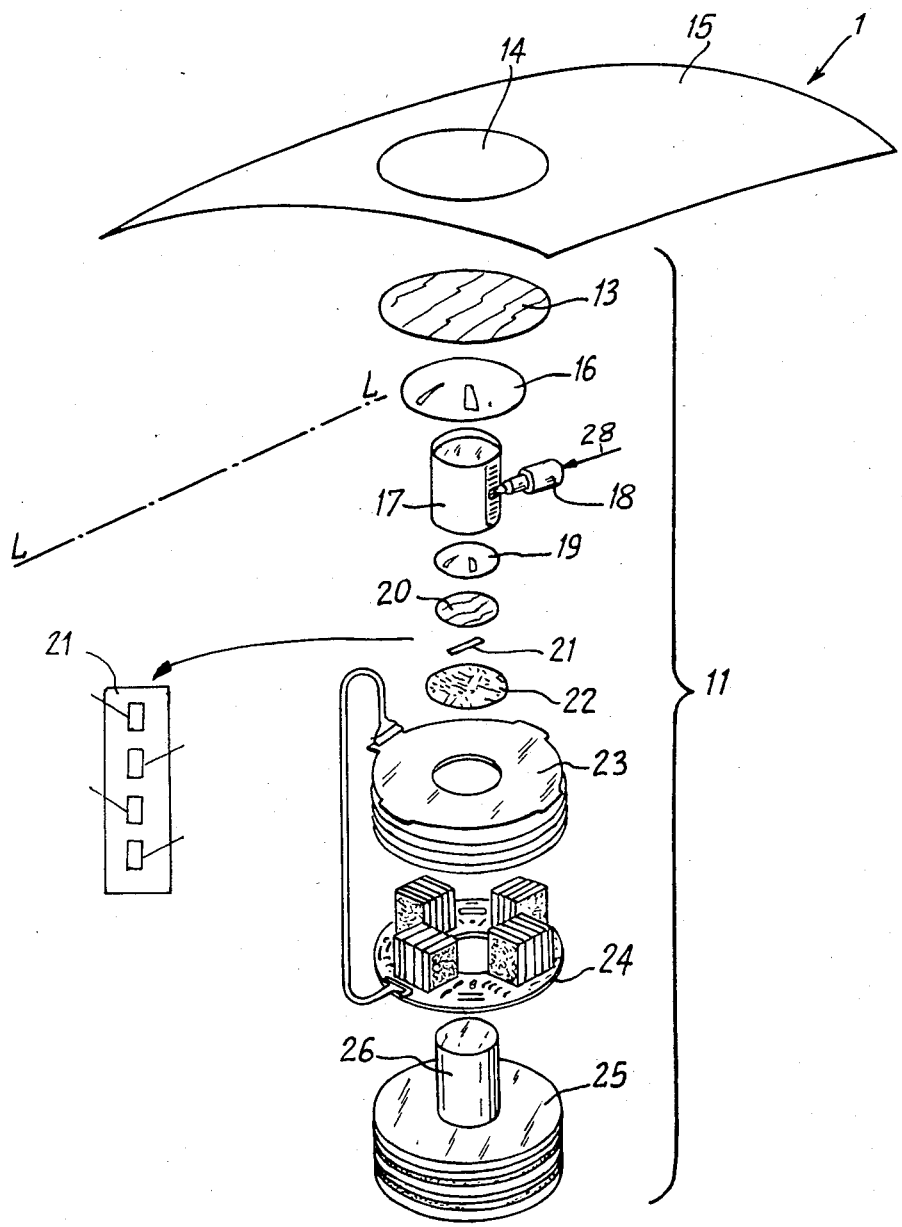

RECONNAISSANCE SYSTEM COMPRISING AN AIR-BORNE VEHICLE ROTATING ABOUT ITS LONGITUDINAL AXIS

The present invention relates to a reconnaissance system comprising an air-borne vehicle moving by rotating about its longitudinal axis.

It is known that aerial reconnaissance systems, which employ optical filming means (in the visible or infrared domain) adapted to be embarked on board a vehicle (such as a reconnaissance aircraft or missile) may either employ the illumination of the landscape when the luminous power is strong, or pick up the infrared energy radiated by the landscape or the targets to be surveyed. These filming means are essentially of three types, namely:

photographic equipment which gives, in the visible or near infrared domain, instantaneous images of a portion of the territory surveyed, but which necessitates either the return of the vehicle to its base, or the development and read-out of the photographic clichés on board the vehicle before transmission by radioelectric waves towards said base. Apart from the fact that such equipment requires considerable illumination of the target in order to give usable clichés, it also obliges the vehicle to be stabilized during filming, unless it is of the type described in U.S. Pat. No. 3,143,048 adapted to be mounted on board a missile moving by rotating about its axis. In this prior known system, the speed of advance of the photographic film of a panoramic camera is controlled by the rotation of the missile. This system therefore presents the other drawbacks of the photographic equipment mentioned above, and cannot be adapted to infrared detection in the spectral band included between 8 $\mu_m$ and 12 $\mu_m$;

television cameras which give a succession of images obtained by a line and column scanning of a detector or a mosaic of detectors and which require good stabilization to ensure overlap of images taken at successive instants (generally every 1/25 second);

scanning systems which simply effect a line scanning, the displacement of the vehicle giving the succession of the lines. Such systems may comprise a stabilized platform and a mirror rotating at high speed to form the scanning lines. As described in U.S. Pat. No. 3,721,410, they may also comprise a detector rigidly fixed to the wall of the vehicle, which is then subjected to a rotation about its longitudinal axis. It is obvious that the scanning systems incorporating a rotating mirror necessitate considerable stabilization during filming. The scanning systems incorporating fixed detector and rotating vehicle impose on said vehicle a very high speed of rotation (for example 200 revolutions per second) for line scanning effected by the detector to be similar to that of a television image. This results in that, in this latter type of scanning system, the vehicle can only be a sort of shell not having a long flying range and not able to carry a high payload.

Thus, none of the known systems is adapted to make a reconnaissance of long duration over enemy territory which, in order to be carried out efficiently, with a low probability of interruption by the enemy defence, necessitates using a reconnaissance vehicle capable of considerable manoeuvrability and having a long flying range. In fact, to escape the enemy defence, the vehicle must make manoeuvres of short duration and high acceleration, which is impossible for a vehicle of the shell type or for vehicles having to ensure considerable stabilization for the filming means in order to obtain clear images or a scanning with exactly juxtaposed lines.

It is an object of the present invention to overcome the drawbacks of the systems mentioned above and it relates to a reconnaissance system which is capable of considerable manoeuvrability and long flying range.

To this end, according to the invention, the reconnaissance system comprising an aerial vehicle capable of moving above a territory to be surveyed by rotating about its longitudinal axis, means for taking images disposed on board said vehicle to observe said territory by a helicoidal scanning in relation with the rotation of said vehicle by means of sensitive members rotating with said vehicle and creating electrical signals representative of said images, is noteworthy in that said vehicle is of the self-propelled missile type and said sensitive members are formed by at least one linear assembly of photosensitive elements disposed parallel to the longitudinal axis of said missile.

At each instant during which they are directed towards the territory, said sensitive members thus take the image of an elementary strip of this territory whose length is parallel to the path of the missile. Further to the rotation of the latter about its longitudinal axis, this elementary strip scans a wide strip of territory, of direction transverse to said path, i.e. upon each revolution of the missile about its axis, said sensitive members scanning, during part of this revolution, said wide strip of territory instead of scanning only a line as in the case of the system of U.S. Pat. No. 3,721,410. The vehicle of the system according to the invention may therefore rotate much less quickly than the vehicle of the latter system, and, consequently, may be constituted by a manoeuvrable self-propelled missile with long flying range, and not by a shell.

Furthermore, it will be noted that there is a fundamental difference in the formation of the images according to U.S. Pat. No. 3,721,410 and according to the present invention. In fact, in this prior Patent, the rotation of the vehicle creates lines transverse to the axis thereof and the advance of said vehicle produces the succession of said lines and therefore the continuous formation of the image. On the other hand, with the system according to the invention, the image of each elementary strip of territory of direction parallel to the advance of the vehicle recorded at a given instant by said linear assembly of photosensitive elements forms a line; in this case, it is thus the rotation of the vehicle which creates the succession of the lines to form a partial image of the territory corresponding to a wide strip thereof of direction transverse to the advance of the vehicle, this advance then being responsible for the succession of the successive partial images.

According to the invention, the total image of the territory to be surveyed is thus constituted by the juxtaposition of a plurality of partial images succeeding one another further to the advance of said missile, each of said partial images being constituted by lines which succeed one another further to the rotation of said missile about its axis.

In order further to increase the length of said elementary strip, and therefore to reduce the speed of rotation of the missile, said sensitive members advantageously comprise an arrangement of a plurality of these linear assemblies of photosensitive elements disposed in alignment parallel to said longitudinal axis of the missile. Each of said assemblies of an arrangement may be provided with its own optics, said optics being adjusted so that the images of the elementary strips of territory given by said linear assemblies of the arrangement are juxtaposed without discontinuity or overlap, so that said arrangement furnishes an image formed by the juxtaposition of the images of said assemblies.

In order to be able to reduce still further the speed of rotation of the missile, a plurality of such arrangements are preferably provided, angularly offset about the longitudinal axis of said missile. In this way, each revolution of the missile furnishes the images of as many wide strips of territory as there are arrangements of photosensitive assemblies in said plurality.

The optics of the linear assemblies of photosensitive elements are advantageously of the type with focal length variable as a function of the angle of roll of the missile and the altitude thereof.

The missile may be remotely controlled from a station located outside the territory to be surveyed. However, it is preferable if the mission of the missile, including its different flight conditions and changes of flight conditions, be effected independently and automatically from a pre-established program embarked on board the missile, the latter comprising in known manner the pick-ups or sensors necessary for the cycle of said program.

The missile may comprise a HF emitter and in that case a ground station is provided which receives, via said on-board emitter, the signals of images coming from the photosensitive elements and the signals coming from the different pick-ups or sensors giving flight parameters (speed, altitude, instantaneous angle of roll, etc.). In this way, the images may be reconstituted on the ground, outside the territory observed, by exploiting the data furnished by said photosensitive elements and pick-ups.

The invention will be more readily understood on reading the following description with reference to the accompanying drawings, in which:

FIGS. 1 and 2 show, in side view and plan view respectively, a reconnaissance missile for the system according to the invention.

FIG. 3 is an exploded view of a detection assembly mounted on said missile.

Figure 7:
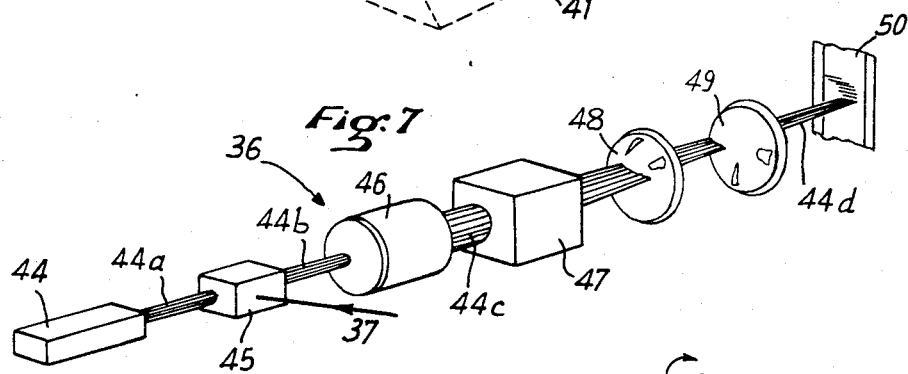
FIGS. 7 and 8 show two variants of the unit for restitution on film of the images taken by the reconnaissance missile.
Figure 8:
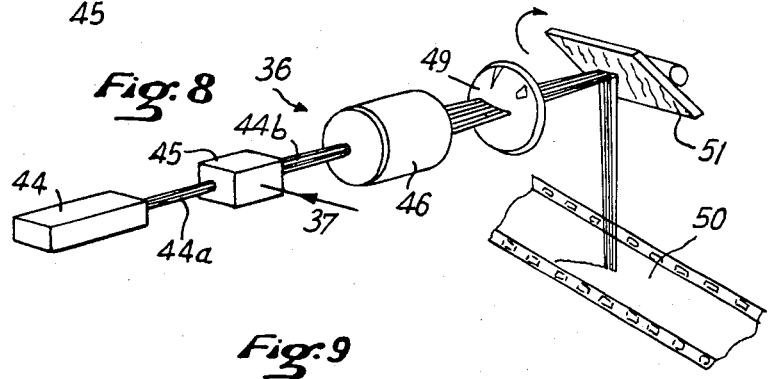
Figure 9:
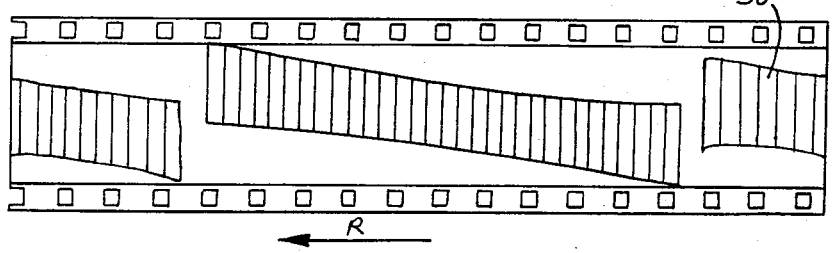

FIG. 9 schematically shows a film obtained by the units of FIGS. 7 and 8.

In these Figures, like references designate like elements.

Referring now to the drawings, the embodiment of missile 1, used in the system according to the invention and shown in FIGS. 1 and 2, is of the self-propelled type, possibly recoverable and is capable of making manoeuvres with a high load factor, whilst having, during filming, a substantially horizontal speed and by rotating on itself about its longitudinal axis L—L at an adjustable angular speed. To this end, the missile 1 comprises wings 2, a stabilizer 3, elevators 4, a rudder 5 and a propulsion system 6.

Figure 5:
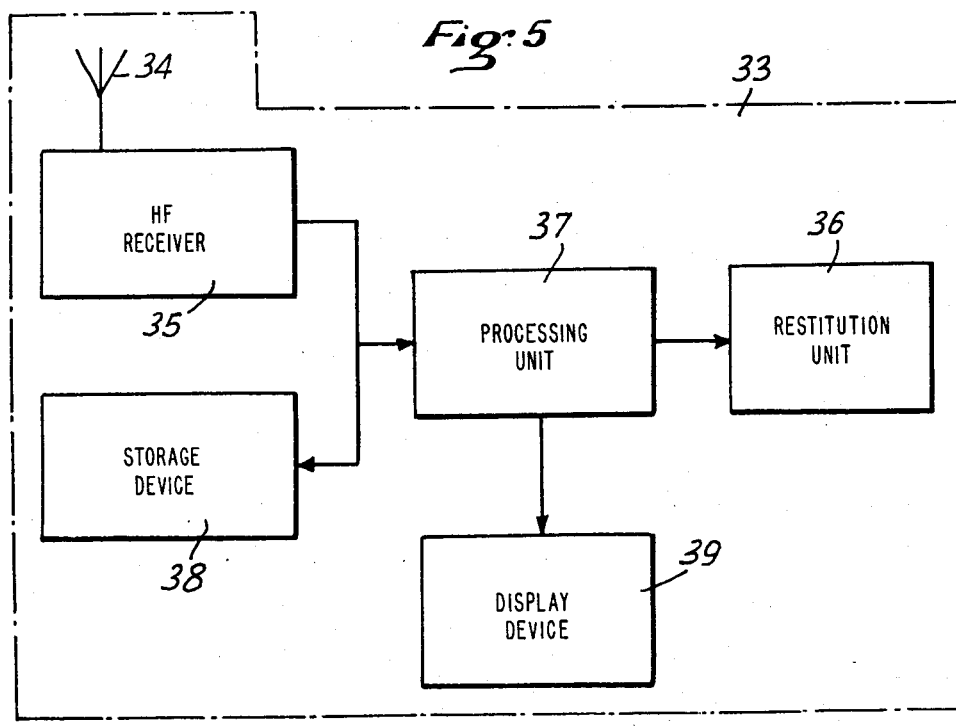
FIG. 5 shows the block diagram of the data restitution device located outside the territory surveyed, generally on the ground.

Inside the missile 1 are provided:

a guiding and piloting device 7 which controls the manoeuvres of said missile and defines the path from a program and on-board sensors, such as an inertial platform and accelerometers (not shown) which also enable the images to be reconstituted;

an assembly 8 comprising a HF emitter and a data storage device, provided in particular with omnidirectional antennas 9 (cf. FIG. 5) to transmit the data to the ground;

an optical part 10 provided with electronic means necessary for elaborating the data. This optical part 10 comprises for example nine identical detection assemblies 11, distributed in three arrangements 12 of three assemblies 11. The three assemblies 11 of an arrangement 12 are aligned parallel to the axis L—L of the missile 1 and the three arrangements 12 are distributed equally about said axis L—L, so that they are offset by 120° with respect to one another about said axis.

FIG. 3 shows in an exploded view one of said detection assemblies 11. As may be seen, each assembly 11 comprises:

a window 13 adapted to blank an opening 14 of corresponding shape provided in the wall 15 of the missile 1 and to protect the optics from the outside medium; when the detection assembly operates in infrared mode, the window 13 may be made of germanium, since this matter is transparent to infrared radiation;

an inlet lens 16;

an optical unit 17 constituted by lenses of which at least one is movable under the action of a motor 18, in order to vary the focal distance of said assembly 11. The motor 18 is controlled by the order generator 28 of the device 8;

an outlet lens 19;

a filter 20 for selecting the frequency band of the radiation desired for the photosensitive elements and which preferably corresponds to a wave length of between 8 $\mu_m$ and 12 $\mu_m$;

photosensitive elements 21 disposed in the form of one or more bars, for example two, aligned parallel to the longitudinal axis L—L of the missile 1; each bar may comprise a plurality (for example 128) of photosensitive elements which are each constituted for example by semiconducting areas of Cd-Hg or Pb-Sn telluride of some tens of $\mu$m, in the event of operating in the 8-12 $\mu$m band;

a support 22 for the or each bar serving, moreover, as connecting network therefor;

an assembly of cables 23 for connecting said support 22 and preamplifiers 24;

an assembly 24 of preamplifiers and the electronics associated therewith whose purpose is to amplify successively the signals issuing respectively from the photosensitive elements of the bars 21 read sequentially; and a cooling unit 25 provided with a finger 26 in contact with bars 1 and assembly 24 to place the detectors and preamplifiers at the optimum operational temperature.

Figure 4:
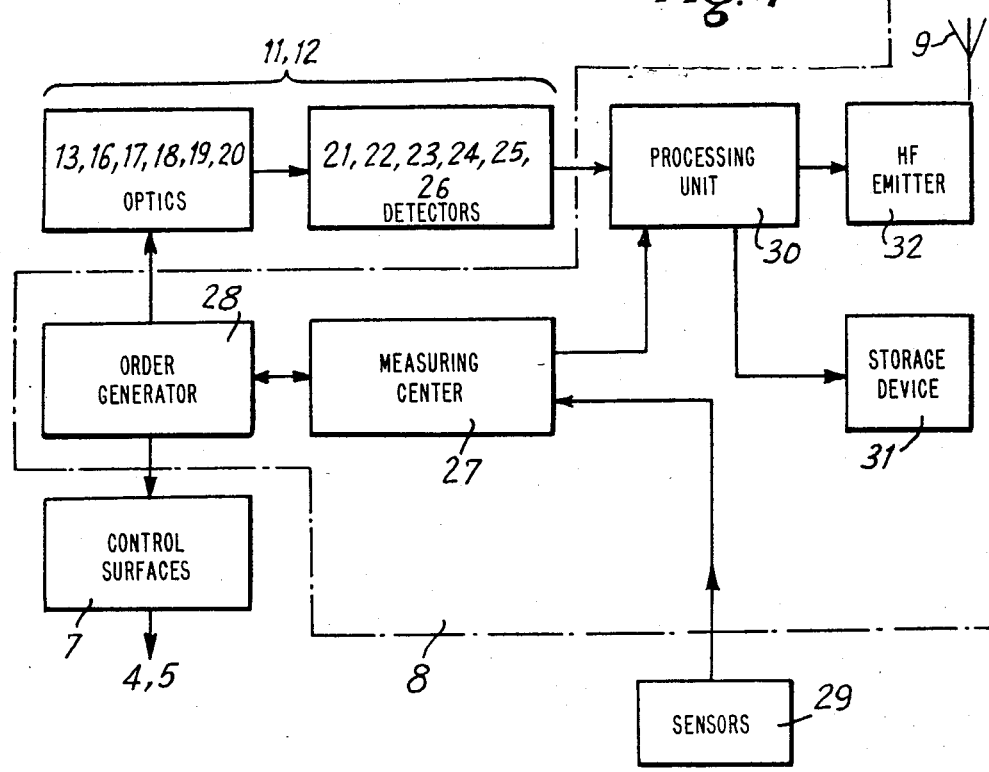
FIG. 4 shows the block diagram of the piloting control and information acquisition device mounted on board the reconnaissance missile.

As may be seen in FIG. 4, the on-board electronic data acquisition assembly 8 comprises a measuring centre 27 in connection with an order generator 28 which, thanks to the measurements furnished by on-board pick-ups and sensors 29, controls both the control surfaces 4, 5 of the missile 1 via the guiding and piloting device 7 and the focal length of the optics 13, 16, 17, 18, 19, 20 via the motors 18. The electronic assembly 8 further comprises a processing unit 30 which shapes the signals that it receives from assemblies 11, thanks to the indications of the measuring centre 27 and sends them to a storage device 31, for example employing magnetic tape, and to a HF emitter 32, which, by antennas 9, transmits them to an exploiting station 33 located outside the territory surveyed and which may present the structure of which the block diagram has been given in FIG. 5. Such an exploiting station 33 is provided with a receiving antenna 34 and the HF receiver 35 adapted to furnish to a restitution unit 36, after processing in a unit 37, the elements enabling the images of the zone surveyed by the missile 1 to be reconstituted. Moreover, the station 33 may comprise a device 38 for storing the data received, as well as a display console 39. In the processing unit 37, the image signals issuing from the detectors 21 are separated from the measurements of speed, angle of roll and angle of attack issuing from sensors 29. These image signals are used for a line modulation either in the restitution unit 36 or at the display console 39, whilst said measurements serve to specify the position and length of the line, i.e. they control the electronic or optical deflectors or the mechanical displacements.

The missile 1 is thus provided with optics 13, 16, 17, 18, 19, 20 disposed on its periphery and grouped in planes passing through its longitudinal axis L—L and capable of giving at each instant the image of a narrow strip of land of direction parallel to said axis L—L. The three optics of an assembly 12 are adjusted for the three corresponding images to lie end to end and aligned parallel to said axis L—L so as to give the single image of an elementary strip of land of which the length is the sum of the lengths of the three individual strips of land. The images of the strips of land are collected by a plurality 21 of the photosensitive elements aligned in the focal plane of said adjustable optics and capable of converting these images into electrical signals. Thanks to the sensors 29, the position and angle of roll of the missile 1 is known at each instant, so that it is possible, thanks to these sensors, to reconstitute the image in station 33, after transmission of the different data by the emitter 32.

Figure 6:
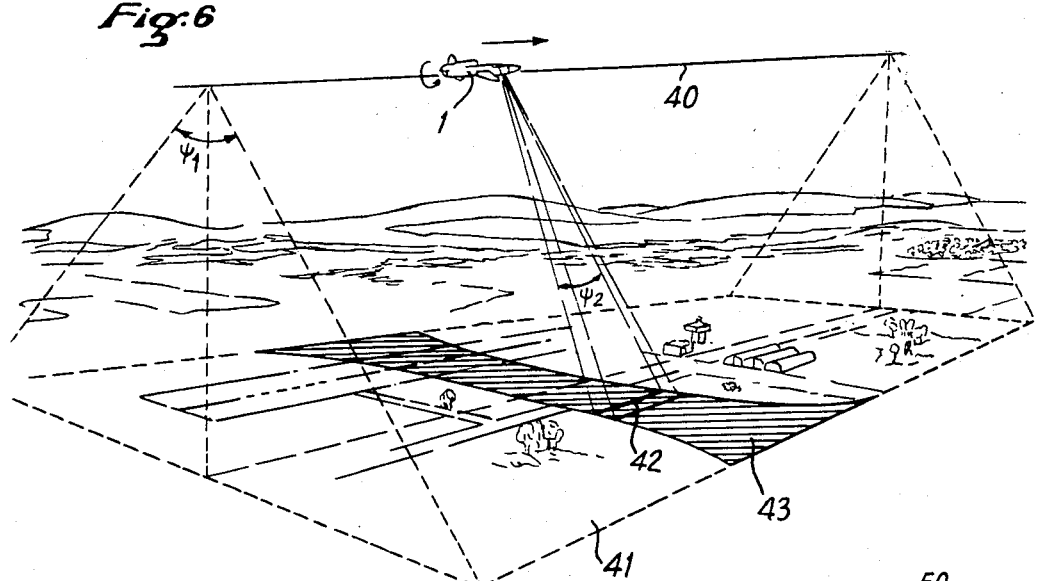
FIG. 6 illustrates the principle of aerial reconnaissance effected by the system according to the invention.

As illustrated in FIG. 6, at the moment of filming, the missile 1 follows a horizontal path 40 above the terrain 41 to be surveyed. It is animated by a rotation on itself about its axis L—L and, at a given instant, the assemblies of detectors 11 of an arrangement 12 recording the image of an elementary strip of land 42, parallel to the displacement. If each detection assembly 11 comprises n photosensitive elements and if each arrangement 12 comprises p detection assemblies 11, the image of the elementary strip of land 42 is formed by $N = n \times p$ dots.

Rotation of missile 1 about its axis L—L enables the land 41 to be scanned and a succession of images of strips 43, transverse to the path 40 and constituted by elementary strips or lines 42 is thus recorded. Upon every half-revolution of the missile 1, there is thus a complete scanning of a strip 43 of large extent, defined laterally by angle $\psi_1$ and longitudinally by angle $\psi_2$.

Angle $\psi_2$ is determined by the number p of assemblies 11 of arrangements 12 and by the number n of the photosensitive elements of each assembly 11, as well as by the altitude of the missile 1.

For practical reasons, the angle $\psi_1$ is advantageously limited to 120°. It is then advantageous to provide three arrangements 12 at 120° on the periphery of missile 1, so that, upon every third of revolution thereof, an image of a strip 43 is obtained.

With a missile 1 flying at 500 m altitude at a speed of 260 m/s, making rolls of 10 g at the period of 2 seconds and equipped with three arrangements 12 of three detection assemblies 11 each provided with 128 photosensitive elements, whose elementary opening is 0.92 mRad, each image of a band 43 is taken in $\frac{2}{3}$ second and covers about 175 m vertically with respect to missile 1 and 350 m at an angle of ±60° for a length of about 1700 m. The image of such a strip is constituted by about 2300 lines (each line being constituted by an elementary image 42) of $128 \times 3 = 384$ dots, so that the definition of the image of the strip 43 is about 900,000 dots.

FIG. 7 schematically shows a restitution unit 36 at the exploiting station 33. As stated above, restitution necessitates prior processing in unit 37 with a view in particular to separating signals coming from the photosensitive elements 21 from the parameters defining the movement of the missile. The restitution unit 36 comprises a laser source 44, for example a helium-neon laser, furnishing a light beam 44a, transmitted to a modulator 45, of the electro-optical or electro-acoustic type, in which it is modulated by a signal coming from the processing unit 37, proportionally to the light intensity received by the photosensitive elements 21. The modulated beam 44b which results therefrom passes through an afocal optical system 46 which magnifies it laterally. The magnified beam 44c then passes through a horizontal deflection cell 47, for example of the acousto-optical type, controlled by a saw-tooth signal whose period corresponds to the read-out of the plurality of photosensitive detectors of zones 42. The deflection cell 47 is followed by an optical correction system 48, then an optical focussing system 49, so that the focalized light beam 44d forms on a film 50 advancing at a speed proportional to the roll of the missile, a modulated light spot of small dimensions which forms an image representative of the successive zones 43.

FIG. 8 shows a variant embodiment similar to FIG. 7 except that the deflection cell 47 and the optical correction system 48 have been eliminated. In this variant, the displacement along a line is controlled by a rotating mirror 51, interposed on the light beam between the optical focussing system 49 and the film 50. In this case, the latter must be driven proportionally to the angle of roll in the longitudinal direction R (FIG. 9).

Correction signals issuing from the measurements of angle of attack and of side-slip of the missile may slightly modify the axis of the rotating mirror or the position of the deflector in order to make the necessary corrections to the resultant image.

The film, once printed, must be developed and projected or displayed to be exploited. Projection devices based on spherical lenses may render the image obtained in accordance with a planimetry of the region observed.

Restitution of images may be effected by purely electronic processes using a cathode-ray tube to display the image. In the same way as before, modulation of a line is controlled by the signals issuing from the bars of detectors 21 and the position of the lines by signals connected with the displacement of the missile and with its instantaneous roll.

What is claimed is:

1. A reconnaissance system capable of making a reconnaissance of long duration and of long flying range over an enemy territory comprising:
   a self-propelled missile capable of making manoeuvres of short duration and high acceleration and moving above said territory along a path by rotating about its longitudinal axis;

a photosensitive detector assembly fixedly attached to said self-propelled missile in a fixed rotating relationship with said missile, for giving an image of said territory;

said photosensitive detector assembly comprising at least one linear arrangement of photosensitive elements arranged parallel to said longitudinal axis of said missile, so that, at an instant during which it is directed towards said territory, said linear arrangement observes an elementary strip of said territory whose length is parallel to the corresponding instantaneous part of said path, such successive elementary strips scanning a wide strip of said territory transverse to said part of path as said missile rotates about its longitudinal axis and said image being formed by such successive transverse wide strips, as said missile moves along its path.

2. The reconnaissance system of claim 1, wherein said photosensitive detector assembly comprises three detectors, each having at least one linear arrangement of photosensitive elements, arranged parallel to the longitudinal axis of said missile, said detectors being equally distributed about said longitudinal axis of said missile, the opening of each detector being 120°.

3. The reconnaissance system of claim 1, comprising a unit for restitution on photographic film of the images picked up by said photosensitive detector assembly, wherein said restitution unit comprises a laser source whose beam is modulated by the electrical signals coming from said photosensitive elements and deviated by a saw-tooth signal whose period is equal to the duration of read-out of the photosensitive elements giving lines of scanning of a partial image, then focussed on a film driven longitudinally at a speed proportional to that of the missile.

4. The reconnaissance system of claim 1, comprising a unit for restitution on photographic film of the images picked up by said photosensitive detector assembly, wherein said restitution unit comprises a laser source whose beam is modulated by the electrical signals coming from said photosensitive elements and deviated by a rotating mirror creating the displacement of the beam in register with the read-out of the photosensitive elements of the scanning lines, then focused on a film driven longitudinally at a speed proportional of that of said missile, and transversely to a speed proportional to the angle of roll.

* * * * *